Jan. 21, 1958  H. F. LESSMANN  2,820,555
POWER SHOVELS OR THE LIKE
Filed June 7, 1954  3 Sheets-Sheet 1
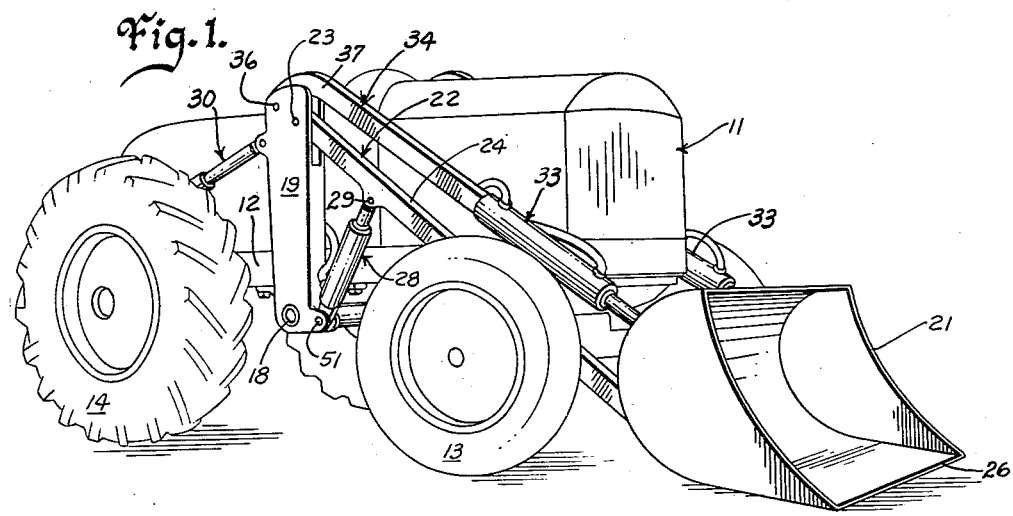
Fig. 1.
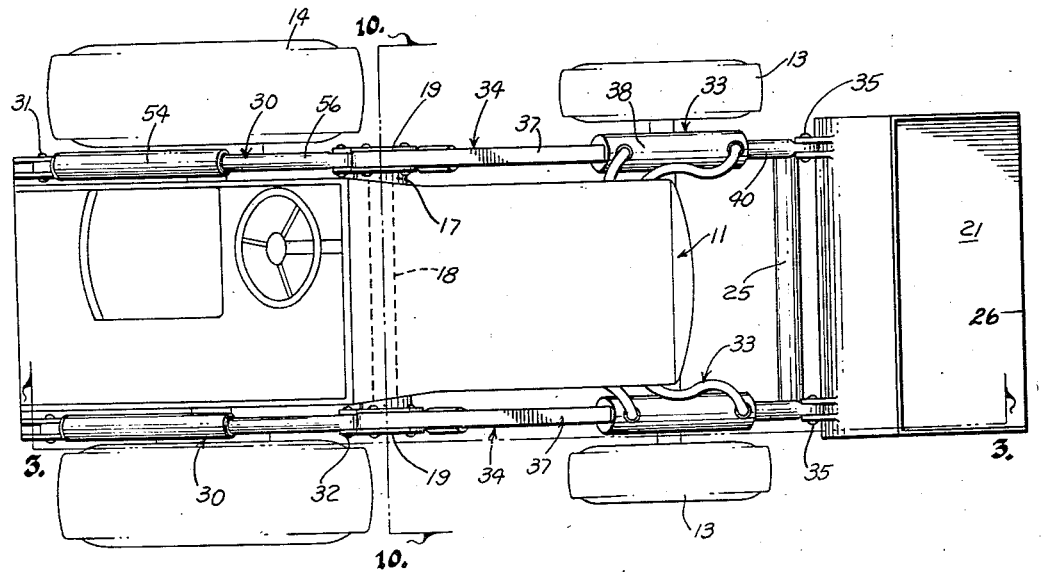
Fig. 2.  Fig. 9.
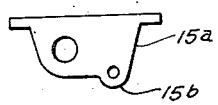
Inventor
Herbert F. Lessmann
by N. B. Willson & Co.
Attorneys

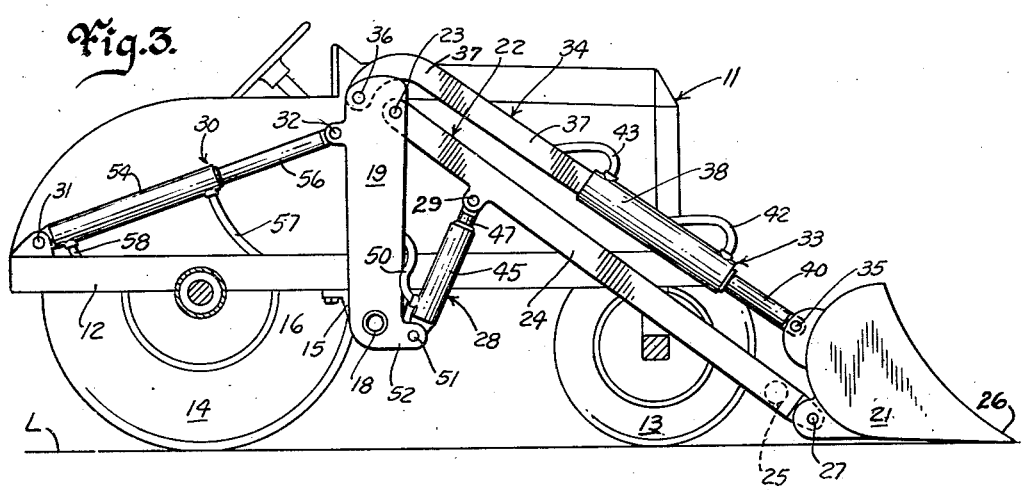
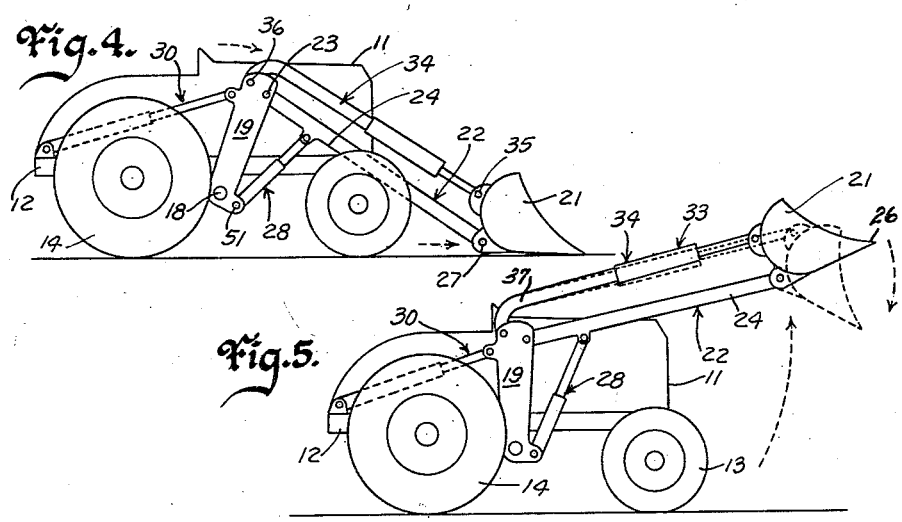
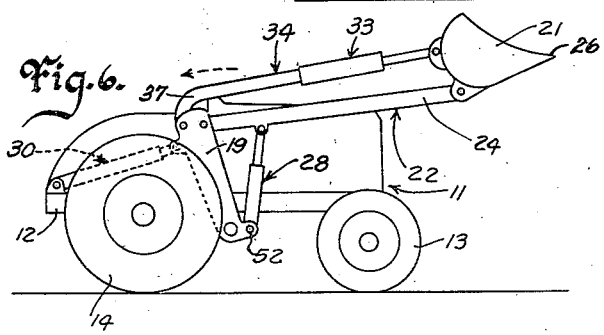

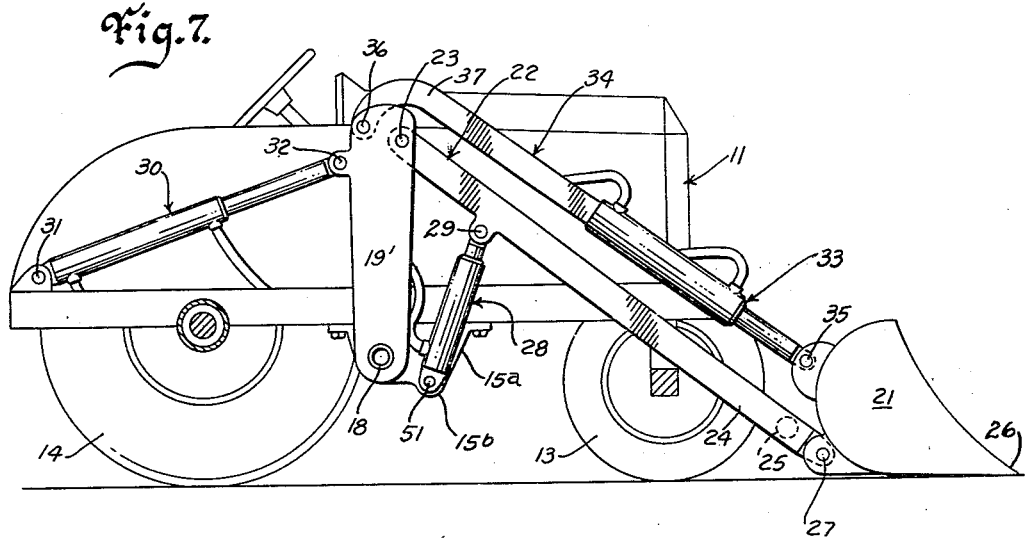
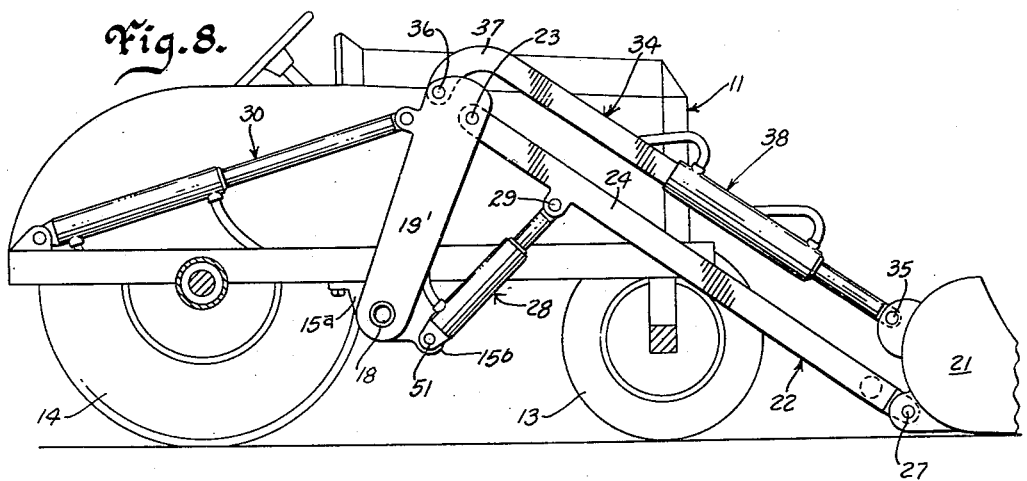
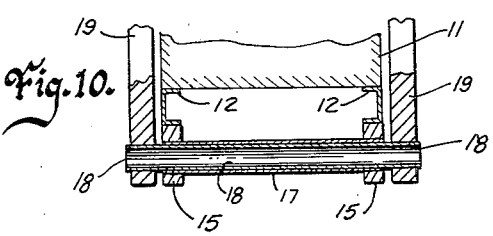

United States Patent Office 2,820,555
Patented Jan. 21, 1958

2,820,555

POWER SHOVELS OR THE LIKE

Herbert Frederick Lessmann, Des Moines, Iowa

Application June 7, 1954, Serial No. 434,988

2 Claims. (Cl. 214—140)

This invention relates to material handling apparatus and more particularly to so-called power shovels for digging and moving earth or other materials from one place and depositing the same at another place.

The invention is especially useful in lightweight machines of about nine thousand pounds with an all-purpose shovel holding about three quarters of a yard. Such a unit is suitable for light work only unless weighted down by counter weight beyond axle capacity ordinarily recommended, but with the use of the present invention such a machine may be safely used for much heavier work since the digging and the loading of the shovel may be done while the machine is standing still and has a better footing and can resist push-back many times greater than it could with traction applied.

One object of the invention is to provide in a power shovel or the like improved means for manipulating the shovel by the use of power created and applied by means of hydraulic cylinder or ram devices so that the digging may be done while the unit is stationary.

Another object is to provide a machine of this character in which a shovel-carrying yoke is lifted by hydraulic devices and is mounted on forwardly and rearwardly oscillating members which are in turn operated by hydraulic devices to greatly increase the digging and power loading operation, to permit of a longer forward reach of the shovel and to permit of better balancing of the loaded shovel during transportation of the load to the place where it is to be deposited.

Another object is to provide in a machine of this character a shovel pivoted to a swinging yoke having pivoted arms and also pivoted to radius arms which are so constructed and mounted that when the yoke is elevated the shovel will swing on its pivotal axis to prevent spilling of the contents.

Another object is to provide in a mechanism of the last mentioned character hydraulic devices in the radius arms to permit the shovel to be set to dig below the wheel level of the tractor or to the best advantage, to facilitate balancing of the loaded shovel and to facilitate the dumping of the shovel at a desired point.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a perspective view of a tractor with the invention applied thereto;

Fig. 2 is a top plan view of the same;

Fig. 3 is a vertical section taken substantially on the plane indicated by the line 3—3 in Fig. 2;

Figs. 4, 5 and 6 are diagrammatic side views showing parts in different positions of adjustment;

Fig. 7 is a side view of a slightly modified form of the invention;

Fig. 8 is a view similar to Fig. 7 with parts in different positions;

Fig. 9 is a detail view of the attaching bracket shown in Figs. 7 and 8; and

Fig. 10 is a detail transverse vertical section taken substantially on the line 10—10 in Fig. 2.

Referring more in detail to the form shown in Figs. 1 through 6 of the drawings, the numeral 11 denotes generally a tractor which is equipped with the usual hydraulic pressure system. The latter is not illustrated and the tractor is conventionally shown, as having two side beams 12 forming part of a body frame supported on front steering wheels 13 and rear driving wheels 14. The invention may be mounted directly on the body frame or on a separate frame suitably applied to the frame of a power driven vehicle. As shown two brackets 15 are detachably mounted on the frame beams 12 and depend therefrom between the front and rear wheels. The brackets may be secured by bolts 16 or other removable fastenings. In these transversely aligned brackets are fixed the ends of a cylindrical bearing tube 17 for a transverse shaft 18. The latter may be solid or tubular and to its projecting ends are fixed upwardly projecting members or levers 19 which oscillate in a forward and rearward direction.

A shovel or other implement 21 is mounted at the free end of a U-shaped frame or yoke 22 hung for swinging movement on pivot pins 23 at the upper front portions of the oscillating members 19. The yoke 22, which straddles the front portion of the tractor, comprises two parallel shovel booms 24 rigidly spaced apart adjacent their free ends by a cross bar 25, the upper ends of the booms or lifting arms 24 being mounted on the pivots 23. The shovel, scoop or bucket 21 is shown as having flat side walls united by a curved rear wall and a flat bottom, the latter having a forward cutting bit 26.

The shovel or other implement 21 is pivoted on a transverse axis 27 at the front of the lifting yoke 22 but its position relative to the ground and its angular position with respect to the yoke are controlled by three pairs of hydraulic cylinders or rams disposed in opposed relation on opposite sides of the tractor. The first pair 28 are hoist cylinders pivoted at 29 to the upper portions of the shovel lifting arms or booms 24 and are primarily used to raise and lower the shovel. The second pair 30 of hydraulic devices are thrust cylinders which are connected between pivots 31 on the rear of the frame 12 and pivots 32 on the upper portions of the oscillating members or levers 19. The third pair 33 of hydraulic devices more directly control the angling or swinging movement of the shovel 21 about its pivot 27 since they are included in radius members or arms 34 which extend in generally parallel relation to the shovel arms or booms 24 and are connected between pivots 35 on the upper rear portions of the shovel and pivots 36 on the upper rear portions of the oscillating or thrust levers 19. Each of the so-called radius arms 34 comprises an upper section 37 with a curved or L-shaped upper end mounted on the pivot pin 36, its lower end being fixed to the cylinder 38 of the double acting hydraulic device 33. The latter includes a piston in the cylinder and a projecting piston rod or ram 40 mounted on the pivot pin 35. As seen in Fig. 2, the two pivots 35 are mounted in ears projecting from the upper portion of the rear of the shovel 21, and when the latter is in its normal lowered position shown in Fig. 3 with its bottom at the wheel level or ground line L, the pivots 35 are spaced a considerable distance above the shovel pivots 27. These pivot pins 27 are also mounted in pairs of ears projecting rearwardly from the bottom portion of the shovel, the ears receiving the reduced ends of the lifting arms 24, as seen in Fig. 3. The pivot pins 23 and 36 for the substantially parallel arms 24 and 34 on each side of the machine pass through a recessed portion of the upper end of the oscillating member 19 in which recess said upper ends of the arms are received; and these pivots 23 and 36 are spaced from each other laterally or in a forward and rearward direction as shown. The hydraulic ram devices 33 are "Crowder" cylinders and fluid under pressure may be forcibly introduced into either end of the cylinders 38 by means of flexible hoses 42 and 43 while being discharged from the other of said hoses to control the distension of the device. Any type of valve means at a control station within reach of the tractor operator may be used to control the direction of flow of the fluid through the hoses or conduits 42 and 43 or for preventing such flow and thereby hydraulically locking the shovel in a desired position of pivotal adjustment. Hence the machine may be used as a straight or stiff arm loader when the oscillating levers 19 are held against swinging by the similar double-acting hydraulic devices 30. Also when the hydraulic devices 33 are locked and the single hydraulic devices 28 are operated to swing the shovel yoke 22 upwardly, the construction of the parts and the arrangement of the pivots 23, 36, 27 and 35 are such that as the shovel is lifted from the position shown in Fig. 3 to the full line position shown in Fig. 5, the shovel is automatically swung about its axis 27 to prevent spilling of its contents. When the shovel is thus elevated it may be tilted to dumping position, shown in dotted lines in Fig. 5, by operating the cylinders or rams 33. It will also be noted that with the parts in the position shown in Fig. 3, the cylinder or ram devices 33 may be operated to tilt the shovel forwardly and downwardly about its axis 27 to cause it to dig below the wheel line or level L or to give it a sharp cutting position.

Each of the hydraulic devices 28 includes a cylinder 45 with a piston therein having a rod or ram member 47 mounted on the pivot pin 29. A single flexible hose 50 extends from the lower end of the cylinder 45 to suitable valve means at the control station so that the pressure fluid may be admitted to the cylinder to distend the device and hold it or to release the fluid so that the weight of the shovel and its arms may force the piston rod into the cylinder. While the cylinder 45 may be pivotally connected to the frame as in Figs. 7 and 8, it is shown in Figs. 1 through 6 as mounted on a pivot pin 51 on an arm 52 projecting forwardly from the lower pivoted end of the oscillating member 19. The latter is thus a bell-crank lever and when it is swung forwardly or rearwardly by the hydraulic device 30, the cylinder pivot 51 will travel in an arc concentric with the shaft 18. That mounting has advantages which will be pointed out later.

Each of the hydraulic devices 30 is a two-way Crowder cylinder similar to the devices 33 and each comprises a cylinder 54 containing a piston and a projecting piston rod or ram member 56 mounted on the pivot pin 32 in ears projecting rearwardly from the upper portion of the lever member 19. The rear end of the cylinder is mounted on the pivot pin 31 in ears or bearing brackets at the rear end of the frame 12. The opposite ends of the cylinder 54 are connected by flexible hoses or conduits 57 and 58 to valve means at the control station so that the piston rod may be moved in either direction or hydraulically locked in any adjusted position. The two lever members 19 may thus be swung in either direction from the perpendicular position shown in Fig. 3 and then locked in the desired position.

It will be seen that by the use of the oscillating members 19, the arms 22 and 34, and the three pairs of hydraulic devices 33, 28 and 30, the shovel may be loaded while the tractor is stationary. It is therefore not necessary to depend upon forward movement of the tractor to load the shovel. When the tractor is standing still it has better footing and can resist push-back many times greater than it could with traction applied. The loading of the shovel is done by the use of power created and applied by means of hydraulic devices. The inclusion of the hydraulic cylinder devices 33 in the radius arms 34 permits the shovel to be tilted about its axis 27 in various positions of the shovel-carrying yoke arms 24 and greatly facilitates the dropping of the load from the shovel at any angle or height. The use of the upright oscillating members 19 in connection with the thrust cylinders or devices 30 and the mounting of the radius arms on said members serve to equalize the shovel while traveling vertically, horizontally or in a semi-circle. The devices 30 act as thrust cylinders for power loading of the shovel without moving the tractor or loading by traction of tractor power or both. The thrust cylinders not only assist the hoist cylinders in extreme digging and power loading as will be seen upon reference to Fig. 4, but may be used to retract the load or shovel with load and also to assist in balancing the loaded shovel when elevated since the shovel may be moved closer to the front of the machine as seen in Fig. 6. The devices 30 may also be used to increase the capacity of the hoist devices 28 when they are pivoted to the arms 52 on the lever members 19 since when the latter are moved backward the pivots 51 move upward and forward through an arc about the axis 18 of the lever members.

The form of the invention shown in Figs. 7 and 8 differs from the above described form in that the hydraulic devices 28 have their lower ends pivotally connected to the frame 12 instead of to the oscillating members 19. As shown the members 19' do not have the short arms 52 and instead of using the bracket 15, brackets 15ᵃ such as shown in Fig. 9 are detachably fastened to the frame 12. These brackets 15ᵃ differ from the brackets 15 only in that they have additional ears 15ᵇ to receive the pivot pins 51 on which the cylinders 45 of the devices 28 are mounted. If desired the brackets 15ᵃ may be used instead of the brackets 15 so that the user of the machine may attach the hydraulic devices 28 either to the frame 12 or to the lever members 19.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a digging and loading mechanism for a power driven wheeled tractor having a frame, a unitary U-shaped oscillatory unit disposed transversely of the intermediate portion of the frame, said unit comprising a horizontal shaft under the frame and mounted for rotation in bearings on the latter, and a pair of normally upright levers disposed at opposite sides of the frame and having their lower ends rigidly fixed to the ends of said shaft, the upper ends of said levers being wide in a forward and rearward direction and carrying a pair of spaced forward and rearward pivots, a yoke straddling the front portion of the frame and including a pair of opposed lifting arms having their rear ends hung on said forward pivots, a tilting shovel with pivots therefore connecting its bottom portion to the front of said yoke, a pair of radius arms disposed above and in substantially parallel relation to said lifting arms, each of said radius arms including a double acting hydraulic device to vary its length, pivots connecting the forward ends of said radius arms to the upper rear portion of the shovel, the rear end portions of said radius arms extending laterally in a downward direction and being hung on said rearward pivots, double acting hydraulic devices connected between the upper portions of said levers and the rear portions of the frame to oscillate said levers in unison to either side of their perpendicular positions, and other hydraulic devices pivotally supported relative to the frame and connected to intermediate portions of said lifting arms, said radius arms, said lifting arms, and the said pivots connecting said arms to the levers and to the shovel being so constructed and arranged that when the shovel is elevated solely by the action of said other hydraulic devices on said lifting arms, the shovel will be automatically swung about its axis to prevent spilling of its contents.

2. In a digging and loading mechanism as defined by claim 1, in which said levers are bell cranks having long upright arms carrying said spaced forward and rearward pivots, and short forwardly projecting arms extending radially with respect to said shaft, and in which said other hydraulic devices have their lower ends pivoted to said short arms of the bell crank levers, whereby when said long arms of the bell crank levers are swung rearwardly from their perpendicular positions the capacity of said pivotally mounted lifting arms is increased.

References Cited in the file of this patent

UNITED STATES PATENTS

| | | |
|---|---|---|
| 1,371,344 | Brackett | Mar. 15, 1921 |
| 2,482,612 | Drott et al. | Sept. 20, 1949 |
| 2,517,582 | Lull | Aug. 8, 1950 |
| 2,538,000 | Hoar et al. | Jan. 16, 1951 |
| 2,683,542 | Baker | July 13, 1954 |
| 2,707,059 | Gerst | Apr. 26, 1955 |